Patented Nov. 7, 1950

2,528,751

UNITED STATES PATENT OFFICE 2,528,751

PREPARATION OF ACID ADSORPTIVE ALUMINA

James B. Hunter, Upper Darby, Pa., assignor to The Atlantic Refining Company, Philadelphia, Pa., a corporation of Pennsylvania No Drawing. Application April 17, 1946, Serial No. 662,935

7 Claims. (Cl. 23—143)

The present invention relates to the production of an alumina characterized by its high acid adsorption and its ability to retain this high acid adsorptivity in storage and upon heating, as well as its usefulness in the preparation of catalysts, adsorbants, refining agents and the like, in which stability upon regeneration is a prime requisite.

Alumina or partially hydrated alumina has been used in various forms heretofore in the treatment of a variety of materials. For example, thermally activated bauxite and alumina scale from the Bayer process have been used for drying gas and vapors, for dehydrating alcohols to produce olefins, for desulfurization of petroleum or fractions thereof, for polymerizing olefins, for decolorizing and refining lubricating oils, sugar solutions, and the like, and as a catalyst for the cracking, dehydrogenation, reforming, and isomerization of petroleum hydrocarbons. In these operations the activity of the alumina gradually decreases due to the accumulation of carbonaceous materials and other impurities, and is regenerated by treatment with steam, or steam followed by air at high temperature. However, upon repeated use and regeneration, the effectiveness of the alumina becomes progressively less, and eventually reaches an uneconomically low level requiring replacement in toto. In order to slow down the rate of deterioration, it usually has been the practice to replace the alumina in small increments by the addition of fresh material. This same difficulty and remedy therefor is likewise characteristic of the synthetic aluminas and catalysts containing substantial amounts of synthetic alumina produced heretofore, particularly the silica-alumina catalyst compositions used in the cracking or reforming of petroleum fractions. These catalysts are usually prepared by separately forming silica and alumina gels and thereafter mixing same in the desired proportions, or by coprecipitating the gels from aqueous solution, and thereafter washing, drying, and thermally activating the products, or by impregnating silica gel with a decomposable aluminum salt and then heating the mixture. Such catalysts are used both in the form of granules or pellets, and in the form of finely divided particles or powder. These catalysts are alternately used for accelerating the cracking reaction, and after such use are regenerated by treatment with steam and then with air at elevated temperature. It has been observed that all of these catalysts, upon regeneration, rapidly lose their conversion efficiency, and are particularly susceptible to deterioration by treatment with steam at elevated temperature. Since steaming has been found to be the most effective way of removing entrained oil from the spent catalyst prior to thermal regeneration in the presence of air, it is apparent that any improvement in the heat stability, and particularly the steam stability, of the catalyst will constitute a marked advantage.

It has further been observed that the aluminas or alumina constituent of known catalysts have a very low capacity for the adsorption of hydrogen ions, e. g., mineral acids, such as dilute hydrochloric acid, and may generally be characterized as non-acid adsorptive aluminas, and these aluminas, as above pointed out, have poor heat stability.

It is therefore an object of this invention to prepare alumina having a high acid adsorptivity and good heat stability, which alumina is eminently suitable for use in the production of catalyst compositions. Such alumina may also be used, per se, in processes in which a material having a high adsorptivity for acids is required.

It is a further object of this invention to prepare high acid adsorptive aluminas which have unusually high rates of filterability or the ability to dewater rapidly. This property, in itself, is most desirable since it renders the washing and removal of soluble salts much more readily accomplished than is the case for the gelatinous almuinas produced by prior art methods.

In accordance with the present invention, I have found that improved aluminas having a high acid adsorptivity and a high heat stability may be prepared by reacting an aqueous solution of aluminum sulfate with an aqueous solution of an alkali metal bicarbonate, or a mixture of carbonate and bicarbonate, of which the latter constitutes at least 50%. While it is possible to use chemically equivalent amounts of aluminum sulfate and bicarbonate or carbonate-bicarbonate mixture, or to use an excess of aluminum sulfate over bicarbonate or carbonate-bicarbonate, it has been found that the best results are obtained using an excess of bicarbonate or carbonate-bicarbonate over aluminum sulfate. It is preferred to employ a total equivalent ratio of bicarbonate or carbonate-bicarbonate of about 1.3, or in other words about 30% excess alkali over that theoretically required for complete reaction with the aluminum sulfate. This ratio may vary somewhat, but should be maintained within the range of 1.1 to 1.5 to obtain aluminas of highest acid adsorptivity and heat stability.

Best results have been obtained using alkali bicarbonate, per se, although suitable aluminas may be prepared using carbonate-bicarbonate mixtures in which the bicarbonate represents at least 50% of the mixture. When the amount of bicarbonate is less than about 50%, the stability of the alumina decreases markedly, the lowest stability being attained using carbonate, per se. The use of soluble aluminum salts such as the chloride, nitrate, and acetate with alkali metal bicarbonate or carbonate-bicarbonate mixtures gives aluminas of mediocre acid adsorptivity and very poor heat stability, as well as of gelatinous structure and poor filterability. Similarly, the production of aluminas by the treatment of any soluble aluminum salt, including the sulfate, with strong alkalis such as sodium, potassium, or ammonium hydroxides yields poor quality products having negligible acid adsorptives and poor stability.

In carrying out the preparation of improved aluminas in accordance with this invention, it is preferred to use reactant solutions of relatively high concentration, since high concentration appears to beneficially affect the resulting alumina. To this end, it is desirable to use solutions having a normality of at least 1, and preferably between 2 and 4. The reaction between the aluminum sulfate and the alkali metal bicarbonate or carbonate-bicarbonate may be carried out at ordinary temperatures (60° F. to 80° F.), or at somewhat higher or lower temperatures without adverse effect. In the preferred method of operation, the aluminum sulfate solution is made up, and to this is added the bicarbonate solution in the required amount. When both bicarbonate and carbonate are used, the necessary amount of bicarbonate solution is added first, and the carbonate solution is thereafter added. However, the order of addition may be reversed, or a mixture of bicarbonate and carbonate may be made up in a single solution, and such solution added to the aluminum sulfate solution. During the addition of the alkali to the sulfate solution, vigorous agitation is maintained, and upon completion of the addition, the reactant solution containing the alumina may be immediately filtered to remove the alumina, or the alumina may be aged in the reaction liquor for a suitable period prior to the filtration or other treatment. It has been found, in general, that ageing of the alumina in the reaction liquor for periods up to about 15 days, gives products of substantially higher acid adsorptivity and heat stability than aluminas which are immediately removed from the reaction liquor and washed. However, regardless of whether or not the alumina is aged, such alumina is ultimately washed with water or aqueous solutions containing ammonium salts in order to remove residual alkali metal compounds, when the presence of such compounds may be deleterious in the use to which the alumina may be put. The aluminas prepared in accordance with the present invention, after washing to remove soluble salts, may then be dried, for example, at 220° F. and then activated by heating at temperatures between 700° F. and 1200° F. Or, if the alumina is to be incorporated with other agents such as catalytic oxides or silica, the alumina may be made into a slurry with water and admixed with a slurry of silica gel, and the mixture dried and activated. When it is desired to incorporate metal oxides with the alumina, the alumina may be incorporated with a decomposible metal salt, for example, by impregnating with a metal salt solution, and the mixture then dried, and ignited if necessary. Or the alumina may be mixed as a slurry with a slurry of a metal hydroxide, and then dried, and ignited if desired.

The present invention may be further illustrated by the following examples, which, however, are not to be construed as limiting the scope thereof.

Various amounts of 1 N. $NaHCO_3$, 1 N. $Na_2CO_3$, and 1 N. NaOH alone and in various ratios to each other were added dropwise, at 80° F. and with vigorous agitation, to 650 cc. portions of 2 N. aluminum salt solutions. This quantity of aluminum salt yielded approximately 22 grams of alumina (dry basis). After precipitation, the alumina slurry was divided into two equal parts. One part was washed immediately with 3 separate portions of 500 cc. each of distilled water, with 5 minutes' stirring per wash. After each wash the alumina was filtered on a Buchner funnel under vacuum (15 inches mercury). Following the last wash and filtration, the cake was repulped with 250 cc. of distilled water, stirred for 5 minutes, and stored in a pint bottle. The second portion of the original slurry (containing the reaction liquor) was stored in a one quart bottle for a period of one week. The slurry was then filtered and washed according to the procedure given above. The washed alumina was then repulped in 250 cc. of distilled water, and stored in a pint bottle. The concentration of alumina in the test samples was therefore 11 grams per 250 cc. of water. The samples thus prepared were then subjected to tests for acid adsorptivity and heat stability.

The slurry sample was vigorously agitated in the bottle and then poured into a 2 inch Buchner funnel under vacuum (15 inches of mercury). The water was thus removed from the alumina which formed a small, compact cake which eventually cracked. After the cake has cracked, the vacuum was released, and two samples of the alumina were taken from the cake by means of a small, open-ended glass cylinder having a length of 3 cm., inside diameter 1.5 cm., and outside diameter 1.75 cm. The quantity of alumina exactly filling this volume was designated as 1 gel unit. One gel unit was placed in each of two 400 cc. beakers and 100 cc. of distilled water was added to produce a thin slurry. The pH of the slurry was determined electrometrically, during agitation, and acid adsorptivity was measured by adding approximately 0.1 N. hydrochloric acid (0.0953 N. HCl) in 10 cc. increments, allowing a suitable period of time to attain an equilibrium pH, which time never exceeded 5 minutes. Increments of hydrochloric acid were added until the pH of the slurry fell to a value below 3. The data may then be plotted as pH against cc. of 0.1 N. HCl, and the number of cc. of 0.1 N. HCl required to lower the pH of the slurry from 4.5 to 3.5 was defined as the adsorption.

The second sample, after making up into a thin slurry with 100 cc. of distilled water, was placed on an electric hot plate and the temperature of the slurry was rapidly brought to the boiling point with continuous stirring. As soon as a temperature of 212° F. was reached, the beaker containing the slurry was removed and quickly transferred to a tray of water (60° F.–80° F.), where the slurry was continuously stirred until the temperature had dropped below 150° F. After reaching room temperature (70° F.), the sample was titrated with hydrochloric acid as described above. The stability was defined as the number of cc. of 0.1 N. HCl required to lower the pH of the heat treated slurry from a value of 4.5 to 3.5.

The results obtained in the various systems are given in the following table:

*System $AlCl_3$—$NaHCO_3$—$NaOH$*

| Equiv. Ratio $NaHCO_3/AlCl_3$ | Final Equiv. Ratio $NaHCO_3+NaOH/AlCl_3$ | Alumina, Washed | | Alumina, Aged-Washed | |
|---|---|---|---|---|---|
| | | Adsorption | Stability | Adsorption | Stability |
| 1.500 | 1.500 | 108 | 4 | 184 | 72 |
| 0.838 | 1.000 | 62 | 3 | 65 | 3 |
| 0.800 | 1.000 | 46 | 3 | 39 | 3 |

*System $AlCl_3$—$NaHCO_3$—$Na_2CO_3$*

| $NaHCO_3/AlCl_3$ | $NaHCO_3+Na_2CO_3/AlCl_3$ | | | | |
|---|---|---|---|---|---|
| 1.300 | 1.300 | 116 | 25 | 130 | 17 |
| 0.838 | 1.300 | 98 | 3 | 119 | 11 |
| 0.500 | 1.300 | 78 | 3 | 90 | 8 |
| 0.000 | 1.300 | 102 | 3 | 84 | 14 |

*System $Al_2(SO_4)_3$—$NaHCO_3$—$Na_2CO_3$*

| $NaHCO_3/Al_2(SO_4)_3$ | $NaHCO_3+Na_2CO_3/Al_2(SO_4)_3$ | | | | |
|---|---|---|---|---|---|
| 1.300 | 1.300 | 302 | 273 | 317 | 296 |
| 0.838 | 1.300 | 322 | 236 | 340 | 254 |
| 0.500 | 1.300 | 205 | 66 | 316 | 141 |
| 0.000 | 1.300 | 324 | 107 | 299 | 110 |

From the above data, it will be seen that in order to produce aluminas having a high acid adsorptivity and stability, it is necessary to employ aluminum sulfate and an alkali metal bicarbonate, or a carbonate-bicarbonate combination in which the bicarbonate predominates. In each of the above examples, the entire quantity of bicarbonate was added first, and the remaining alkali required, i. e., carbonate or hydroxide was then added. It will be observed that in most cases, ageing of the alumina in the reaction liquor for 7 days, prior to washing, resulted in a marked increase in adsorptivity and stability. The preferred aluminas of this invention have an adsorptivity of at least 300 and a stability of at least 200, although aluminas having an adsorptivity of at least 200 and a stability of at least 100 have been found useful.

I claim:

1. The method of producing an acid adsorptive alumina, which consists in reacting the entire amount of aluminum sulfate present in an aqueous solution with an alkali metal bicarbonate, and separating the alumina from the reactant solution.

2. The method of producing an acid adsorptive alumina, which consists in reacting the entire amount of aluminum sulfate present in an aqueous solution with an alkali metal bicarbonate in an amount between 1.1 and 1.5 chemical equivalents, and separating the alumina from the reactant solution.

3. The method of producing an acid adsorptive alumina, which consists in reacting the entire amount of aluminum sulfate present in an aqueous solution with an alkali metal bicarbonate in an amount between 1.1 and 1.5 chemical equivalents, separating the alumina from the reactant solution, washing the alumina to remove soluble salts, and drying the washed alumina at elevated temperature.

4. The method of producing an acid adsorptive alumina, which consists in reacting the entire amount of aluminum sulfate present in an aqueous solution with a mixture of an alkali metal carbonate and bicarbonate, the bicarbonate constituting at least 50% of the mixture, separating the alumina from the reactant solution, washing the alumina to remove soluble salts, and drying the washed alumina at elevated temperature.

5. The method of producing an acid adsorptive alumina which consists in reacting the entire amount of aluminum sulfate present in an aqueous solution with an aqueous solution of alkali from the group consisting of alkali metal bicarbonate and alkali metal bicarbonate-carbonate mixture in which the bicarbonate consists of at least 50% mol equivalent of said mixture, and separating the alumina from the reactant solution.

6. The method of producing an acid adsorptive alumina which consists in reacting the entire amount of aluminum sulfate present in an aqueous solution with an aqueous solution of alkali from the group consisting of alkali metal bicarbonate and alkali metal bicarbonate-carbonate mixture, in which the bicarbonate consists of at least 50% mol equivalent of said mixture, said alkali being in an amount between 1.1 and 1.5 chemical equivalents of said aluminum sulfate, and separating the alumina from the reactant solution.

7. The method of producing an acid adsorptive alumina which consists in reacting the entire amount of aluminum sulfate present in an aqueous solution with an alkali metal bicarbonate, aging the resultant alumina in the reactant solution for a period up to 15 days, separating the alumina from the reactant solution, washing the alumina to remove soluble salts, drying the washed alumina, and activating the alumina by heating between 700° F. and 1200° F.

JAMES B. HUNTER.

REFERENCES CITED

The following references are of record in the file of this patent:

UNITED STATES PATENTS

| Number | Name | Date |
|---|---|---|
| 2,137,638 | Sondern | Nov. 22, 1938 |
| 2,378,155 | Newsome | June 12, 1945 |

FOREIGN PATENTS

| Number | Country | Date |
|---|---|---|
| 88,535 | Switzerland | Mar. 1, 1821 |